(12) United States Patent
Aigner et al.

(10) Patent No.: US 11,440,381 B2
(45) Date of Patent: Sep. 13, 2022

(54) MOTOR VEHICLE SIDE WINDOW ARRANGEMENT

(71) Applicant: Bayerische Motoren Werke Aktiengesellschaft, Munich (DE)

(72) Inventors: Johann Aigner, Neufahrn (DE); Florian Wallner, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 60 days.

(21) Appl. No.: 16/761,419

(22) PCT Filed: Jan. 17, 2019

(86) PCT No.: PCT/EP2019/051146
§ 371 (c)(1),
(2) Date: May 4, 2020

(87) PCT Pub. No.: WO2019/149534
PCT Pub. Date: Aug. 8, 2019

(65) Prior Publication Data
US 2020/0391578 A1    Dec. 17, 2020

(30) Foreign Application Priority Data
Feb. 1, 2018   (DE) .................. 10 2018 201 528.7

(51) Int. Cl.
*B60J 1/17*    (2006.01)
*B60J 10/74*   (2016.01)
*B60J 1/00*    (2006.01)

(52) U.S. Cl.
CPC ................ *B60J 1/17* (2013.01); *B60J 1/008* (2013.01); *B60J 10/74* (2016.02)

(58) Field of Classification Search
CPC ..... B60J 1/17; B60J 10/74; B60J 1/008; B60J 5/0402; B60J 10/76
(Continued)

(56) References Cited

U.S. PATENT DOCUMENTS 10,603,996 B2 * 3/2020 Mizutani ............... E06B 7/2312
2005/0166460 A1   8/2005 Watanabe et al.
(Continued)

FOREIGN PATENT DOCUMENTS

BE    409855 A     7/1935
DE  34 14 186 A1  10/1985
(Continued)

OTHER PUBLICATIONS

International Search Report (PCT/ISA/210) issued in PCT Application No. PCT/EP2019/051146 dated Mar. 8, 2019 with English translation (five pages).
(Continued)

*Primary Examiner* — Jason S Morrow
(74) *Attorney, Agent, or Firm* — Crowell & Moring LLP

(57) ABSTRACT

A motor vehicle side window arrangement has a side window pane, which has a left edge, a right edge, a top edge connecting the left and right edges in the top region thereof and a bottom edge connecting the left and right edges in the bottom region thereof, which bottom edge is operatively connected to a window lever, and a seal. In the closed state of the side window pane, the seal has a left section adjacent to the left edge, a right section adjacent to the right edge, a top section adjacent to the top edge and a seal base. An improved sealing effect is obtained by the right edge adjacent to the right section of the seal having, in the top region thereof, a smaller distance from the seal base than in the bottom region thereof.

9 Claims, 2 Drawing Sheets

(58) Field of Classification Search
USPC .................................................. 296/146.16
See application file for complete search history.

(56) References Cited

U.S. PATENT DOCUMENTS

| | | | |
|---|---|---|---|
| 2007/0251152 A1* | 11/2007 | Takase | B60J 10/74 49/441 |
| 2007/0271853 A1* | 11/2007 | Yatsuda | B60J 10/74 49/489.1 |
| 2017/0167177 A1* | 6/2017 | Shimizu | E05F 11/483 |
| 2020/0256111 A1* | 8/2020 | Kashiwagi | E05F 15/689 |
| 2020/0262273 A1* | 8/2020 | Arimoto | B60J 1/007 |
| 2021/0054672 A1* | 2/2021 | Tanaka | B60J 1/17 |

FOREIGN PATENT DOCUMENTS

| | | |
|---|---|---|
| JP | 61-30517 U | 2/1986 |
| JP | 62-16511 U | 1/1987 |

OTHER PUBLICATIONS

German-language Written Opinion (PCT/ISA/237) issued in PCT Application No. PCT/EP2019/051146 dated Mar. 8, 2019 (five pages).

German-language Search Report issued in German Application No. 10 2018 201 528.7 dated Sep. 18, 2018 with partial English translation (13 pages).

\* cited by examiner

MOTOR VEHICLE SIDE WINDOW ARRANGEMENT

BACKGROUND AND SUMMARY OF THE INVENTION

The present invention relates to a motor vehicle side window arrangement and to a motor vehicle equipped therewith.

An arrangement of movable side windows in motor vehicles is well known. A more precise illustration of a corresponding arrangement known from the prior art can be found in FIG. 1 in this document, in which a motor vehicle 1 is symbolically shown. Located therein is a side window 5, which has a left-hand edge 10-1, a right-hand edge 10-2 substantially parallel thereto, an upper edge 10-3 connecting said left-hand and right-hand edges together in an upper region, and a lower edge 10-4 connecting the left-hand edge 10-1 and the right-hand edge 10-2 together in the lower region thereof. A portion thereof is fastened to a window lifter 15 (shown only in part here) such that the side window 5 in FIG. 1 can move in the direction of the indicated double arrow. According to the design, the window lifter 15 is located at the center of friction of the arrangement and is formed in a single-train manner.

For the purpose of guiding the side window 5 during a corresponding opening or closing movement and of sealing off the closed side window 5 from penetrating moisture and noise, a seal 20 is provided, which has a left-hand portion 25-1, a right-hand portion 25-2, and an upper portion 25-3 connecting the upper region of the two. Each of said portions 25-1, 25-2 and 25-3 has a substantially U-shaped profile cross section, wherein the seal base 25-7 thereof, according to the illustration chosen in FIG. 1, is oriented substantially orthogonally to the plane of the paper. The side window 5 and the seal 20 jointly form a motor vehicle side window arrangement 30.

During an opening or closing movement of the side window 5, the left-hand edge 10-1 and the right-hand edge 10-2 are guided in a substantially identical manner at the left-hand portion 25-1 and right-hand portion 25-2, respectively, and the seal base 25-7.

It has now become apparent in practice that, in spite of the design of the arrangement, tilting of the side window 5 about a virtual axis (not shown here) that is orthogonal to the paper plane can occur at the center of friction, with the result that the above-described sealing effect is disadvantageously no longer achieved as desired.

The object of the present invention is to overcome this disadvantage.

This object is achieved by a motor vehicle side window arrangement having the following features:
- a side window, which has a left-hand edge, a right-hand edge, an upper edge connecting said left-hand and right-hand edges in the upper region thereof, and a lower edge connecting said left-hand and right-hand edges in the lower region thereof,
- which lower edge is operatively connected to a window lifter, and
- a seal, which, in the closed or partially open state of the side window, has a left-hand portion adjacent to the left-hand edge, a right-hand portion adjacent to the right-hand edge, an upper portion adjacent to the upper edge, and a seal base, wherein
- the right-hand edge adjacent to the right-hand portion of the seal is at a smaller distance from the seal base in its upper region than in its lower region.

The invention is based on the finding that the desired sealing action can be achieved advantageously with an arrangement of the side window away from the center of friction. To this end, the side window and seal are formed in the manner disclosed above. Any tilting, known from the prior art, of the side window during assembly or operation can in this way advantageously be compensated.

According to a preferred embodiment, the left-hand edge is oriented parallel to the left-hand portion and/or the upper edge is oriented parallel to the upper portion. Thus, while the right-hand edge of the side window, as set out above, does not extend parallel to the right-hand edge, the left-hand edge and/or the upper edge can extend parallel to the respective seal portion, with the result that the sealing action is further enhanced.

This is the case all the more so when, according to a further embodiment, the right-hand edge is not formed parallel to the left-hand edge.

Likewise, it is possible for the left-hand edge not to extend parallel to the seal.

According to a further preferred embodiment, the distance of the left-hand edge from the seal base of the left-hand portion is greater than the distance of the right-hand edge from the seal base of the right-hand portion. As a result, tipping of the side window is advantageously avoided, wherein the advantages set out above are retained. Alternatively, it is possible for the distance of the right-hand edge from the seal base of the right-hand portion to be greater than the distance of the left-hand edge from the seal base of the left-hand portion; the abovementioned advantages apply equally in this case.

As stated above, the invention is based on the finding that the desired sealing action can be achieved with an arrangement of the side window away from the center of friction. To this end, provision is advantageously made to connect the side window to the window lifter in an off-center manner.

The object set out above is likewise achieved by a motor vehicle that has at least one motor vehicle side window arrangement of the type disclosed above. The above-described advantages apply correspondingly.

A detailed, nonprejudicial, in particular nonlimiting, description of an exemplary embodiment of the present invention is given in the following text with reference to the appended figures, which are not to scale.

DETAILED DESCRIPTION OF THE DRAWINGS

Figure 1:
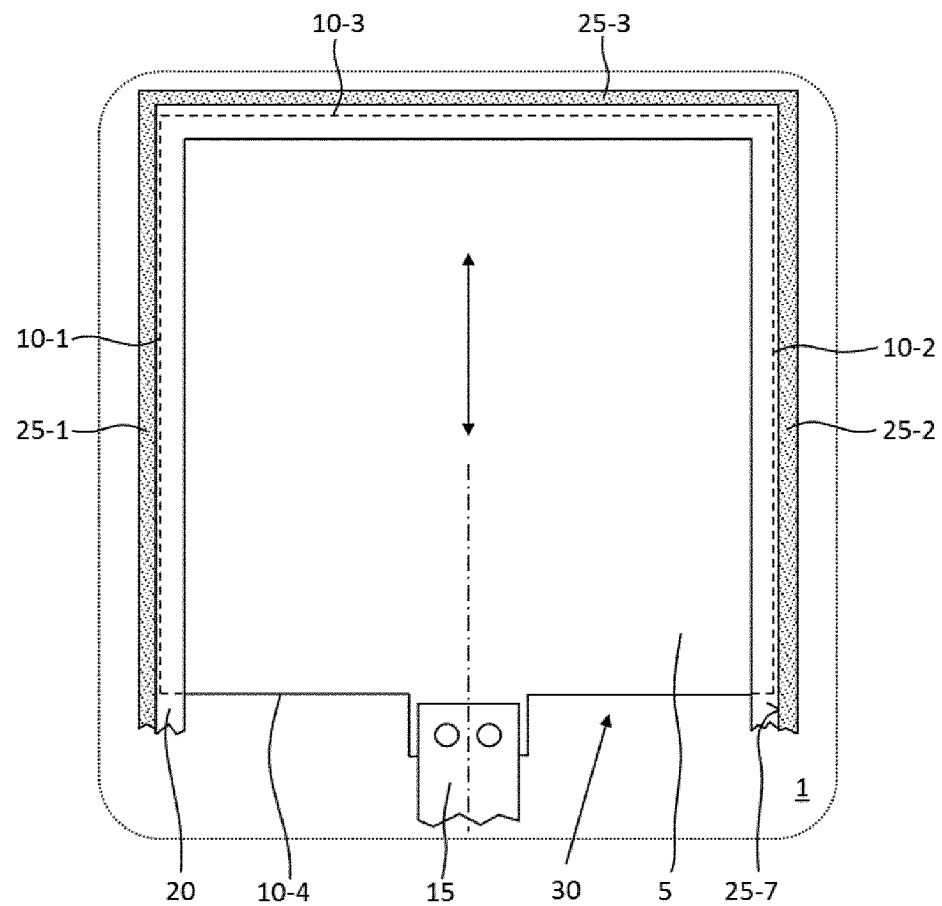
FIG. 1 shows a motor vehicle side window arrangement according to the prior art.

FIG. 1 illustrates a motor vehicle side window arrangement 30 according to the prior art. Since this has already been explained above, reference is made thereto in order to avoid repetitions.

Figure 2:
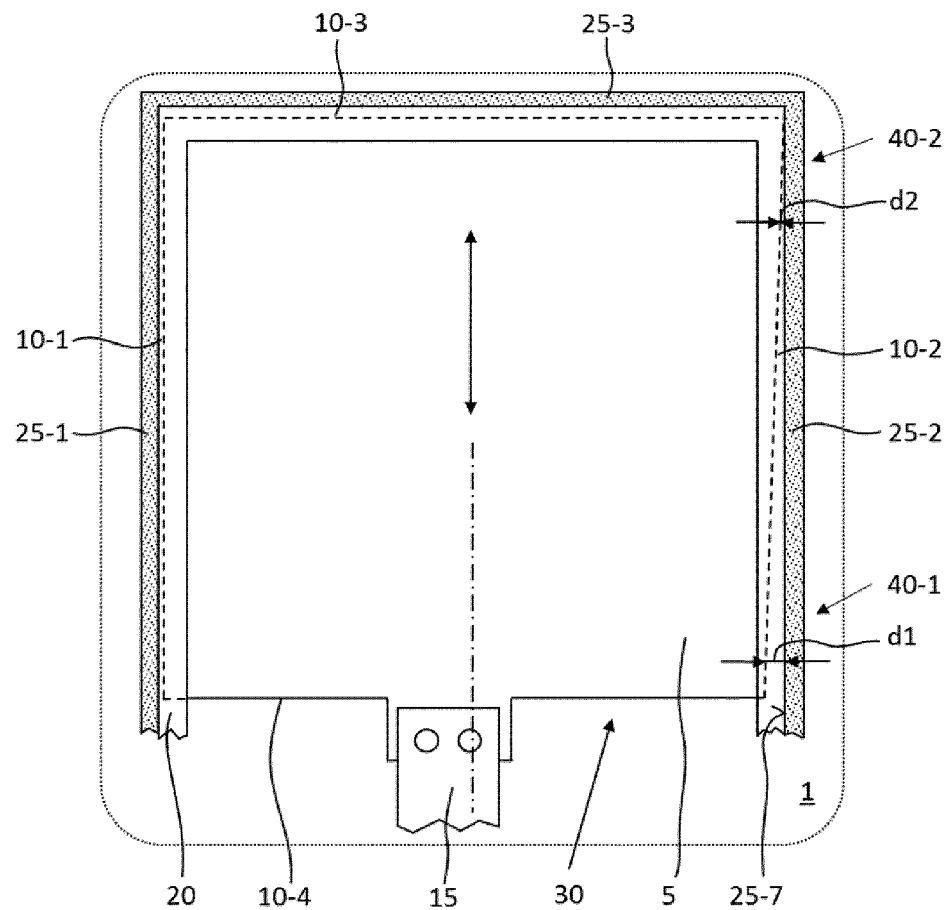
FIG. 2 shows an embodiment of a motor vehicle side window arrangement according to an embodiment of the invention in a motor vehicle.

FIG. 2 shows a motor vehicle side window arrangement 30 according to an embodiment of the present invention, which is located in a motor vehicle 1. The motor vehicle side window arrangement 30 according to this exemplary embodiment differs from the motor vehicle side window arrangement 30 known from the prior art by way of the following features.

The right-hand edge 10-2 has a lower region 40-1 and an upper region 40-2. The lower region 40-1 is spaced apart from the corresponding portion of the seal base 25-7 by a distance d1. The upper region 40-2 is spaced apart from the corresponding portion of the seal base 25-7 by a distance d2. As can be seen, while not to scale, the distance d2 is smaller than the distance d1. Therefore, the single-train window lifter 15, in contrast to what is shown in FIG. 1, is no longer located at the center of friction.

The right-hand edge 10-2 shown here is formed in a straight manner, resulting in a linearly decreasing profile of the distance from d1 in the direction of d2. This does not have to be the case, however; rather, the right-hand edge 10-2 can also have a non-straight profile. What is important in this case is that the upper region 40-2, in FIG. 2, of the edge 10-2 runs ahead of the lower region 40-1 thereof during a closing movement of the side window 5 as seen in the direction of the upper edge 10-3, and runs behind it during the opening movement thereof.

It goes without saying that the upper region 40-2 can bear against the seal base 25-7. To avoid any noise occurring during a closing or opening movement, the seal base 25-7 is coated, as is known per se.

Furthermore, the invention differs from the prior art by having an altered attachment point for the window lifter 15. The latter is now no longer fastened to the side window 5 centrally, but in an off-center position, this advantageously supporting the above-described running-ahead or running-behind movement.

LIST OF REFERENCE SIGNS

1 Motor vehicle
5 Side window
10-1 Left-hand edge
10-2 Right-hand edge
10-3 Upper edge
10-4 Lower edge
15 Window lifter
20 Seal
25-1 Left-hand portion
25-2 Right-hand portion
25-3 Upper portion
25-7 Seal base
30 Motor vehicle side window arrangement
40-1 Lower region
40-2 Upper region
d1 Distance
d2 Distance

What is claimed is:

1. A motor vehicle side window arrangement, comprising:
    a side window, which has a left-hand edge, a right-hand edge, an upper edge connecting said left-hand and right-hand edges in an upper region thereof, and a lower edge connecting said left-hand and right-hand edges in a lower region thereof,
    wherein the lower edge is operatively connectable to a window lifter; and
    a seal, which, in a closed state of the side window, has a left-hand portion adjacent to the left-hand edge, a right-hand portion adjacent to the right-hand edge, an upper portion adjacent to the upper edge, and a seal base, wherein the seal seals off the side window in the closed state of the side window from moisture and noise,
    wherein the right-hand edge adjacent to the right-hand portion of the seal is at a smaller distance from the seal base in an upper region than in a lower region,
    wherein the right-hand edge of the side window is straight with a linearly decreasing profile of a distance of the right-hand edge to the seal base from the lower region to the upper region.

2. The motor vehicle side window arrangement according to claim 1, wherein
    the left-hand edge is oriented parallel to the left-hand portion and/or the upper edge is oriented parallel to the upper portion.

3. The motor vehicle side window arrangement according to claim 2, wherein
    the right-hand edge is not formed parallel to the left-hand edge.

4. The motor vehicle side window arrangement according to claim 1, wherein
    the right-hand edge is not formed parallel to the left-hand edge.

5. The motor vehicle side window arrangement according to claim 1, wherein
    a distance of the left-hand edge from the seal base of the left-hand portion is greater than the distance of the right-hand edge from the seal base of the right-hand portion.

6. The motor vehicle side window arrangement according to claim 3, wherein
    a distance of the left-hand edge from the seal base of the left-hand portion is greater than the distance of the right-hand edge from the seal base of the right-hand portion.

7. The motor vehicle side window arrangement according to claim 1, wherein
    the side window is connected to the window lifter in an off-center manner.

8. A motor vehicle, comprising at least one motor vehicle side window arrangement according to claim 1.

9. The motor vehicle according to claim 8, wherein
    the side window is connected to the window lifter in an off-center manner.

* * * * *